D. SAMAIA.
APPARATUS FOR THE DELIVERY OF SEVERAL LIQUIDS SIMULTANEOUSLY OR SUCCESSIVELY.
APPLICATION FILED AUG. 23, 1917.

1,300,490.

Patented Apr. 15, 1919.
12 SHEETS—SHEET 1.

Fig. 1

D. SAMAIA.
APPARATUS FOR THE DELIVERY OF SEVERAL LIQUIDS SIMULTANEOUSLY OR SUCCESSIVELY.
APPLICATION FILED AUG. 23, 1917.

1,300,490.

Patented Apr. 15, 1919.
12 SHEETS—SHEET 4.

D. SAMAIA.
APPARATUS FOR THE DELIVERY OF SEVERAL LIQUIDS SIMULTANEOUSLY OR SUCCESSIVELY.
APPLICATION FILED AUG. 23, 1917.

1,300,490.

Patented Apr. 15, 1919.
12 SHEETS—SHEET 5.

Fig. 6.

D. SAMAIA.
APPARATUS FOR THE DELIVERY OF SEVERAL LIQUIDS SIMULTANEOUSLY OR SUCCESSIVELY.
APPLICATION FILED AUG. 23, 1917.

1,300,490.

Patented Apr. 15, 1919.
12 SHEETS—SHEET 6.

D. SAMAIA.
APPARATUS FOR THE DELIVERY OF SEVERAL LIQUIDS SIMULTANEOUSLY OR SUCCESSIVELY.
APPLICATION FILED AUG. 23, 1917.

1,300,490.

Patented Apr. 15, 1919.
12 SHEETS—SHEET 7.

D. SAMAIA.
APPARATUS FOR THE DELIVERY OF SEVERAL LIQUIDS SIMULTANEOUSLY OR SUCCESSIVELY.
APPLICATION FILED AUG. 23, 1917.

1,300,490.

Patented Apr. 15, 1919.
12 SHEETS—SHEET 8.

D. SAMAIA.
APPARATUS FOR THE DELIVERY OF SEVERAL LIQUIDS SIMULTANEOUSLY OR SUCCESSIVELY.
APPLICATION FILED AUG. 23, 1917.

1,300,490.

Patented Apr. 15, 1919.

D. SAMAIA.
APPARATUS FOR THE DELIVERY OF SEVERAL LIQUIDS SIMULTANEOUSLY OR SUCCESSIVELY.
APPLICATION FILED AUG. 23, 1917.

1,300,490.

Patented Apr. 15, 1919.
12 SHEETS—SHEET 12.

UNITED STATES PATENT OFFICE.

DINO SAMAIA, OF MILAN, ITALY.

APPARATUS FOR THE DELIVERY OF SEVERAL LIQUIDS SIMULTANEOUSLY OR SUCCESSIVELY.

1,300,490. Specification of Letters Patent. Patented Apr. 15, 1919.

Application filed August 23, 1917. Serial No. 187,912.

*To all whom it may concern:*

Be it known that I, DINO SAMAIA, subject of the King of Italy, residing at Milan, Italy, Via Meravigli No. 10, have invented certain new and useful Improvements in Apparatus for the Delivery of Several Liquids Simultaneously or Successively, of which the following is a specification.

The invention relates to apparatus for the simultaneous or successive delivery of several liquids, this apparatus making it possible to vary at will the combinations of liquids to be delivered simultaneously.

The apparatus comprises substantially a main receptacle which is subdivided into a certain number of compartments or secondary receptacles that are to contain the various liquids or liquors under pressure. Into each of these receptacles there is plunged a tube for supplying liquid, controlled by a valve, and the valves corresponding to the various supply tubes may be actuated, singly or in groups, by means of a device the operation of which is controlled from outside the apparatus.

The apparatus also comprises: means for regulating the delivery of the liquids; means for the independent delivery of water and seltzer; and means for washing the valves and the delivery pipes.

The device for operating the valves consists of a rotatable drum having on its periphery pins or pegs or groups of pins or pegs intended for operating single valves or groups of valves according to the combinations or mixtures of liquids that it is desired to serve. In order to increase if desired, the number of combinations that can be effected, the said drum may comprise supplementary sets of pegs which will be brought into the operative position by displacing the drum laterally. The valves may also be operated by means of keys or pushes provided on the external wall of the apparatus.

Finally the various receptacles of the liquors are provided with level gages, which also serve for the filling of the receptacles.

In the accompanying drawings:—

The apparatus consists of an outer casing 21 in which the main receptacle 22 is inclosed. This outer casing is surmounted by a dome 23 in which are installed the delivery valves, and by a cap 24 that protects the device that operates the said valves.

Figure 2:
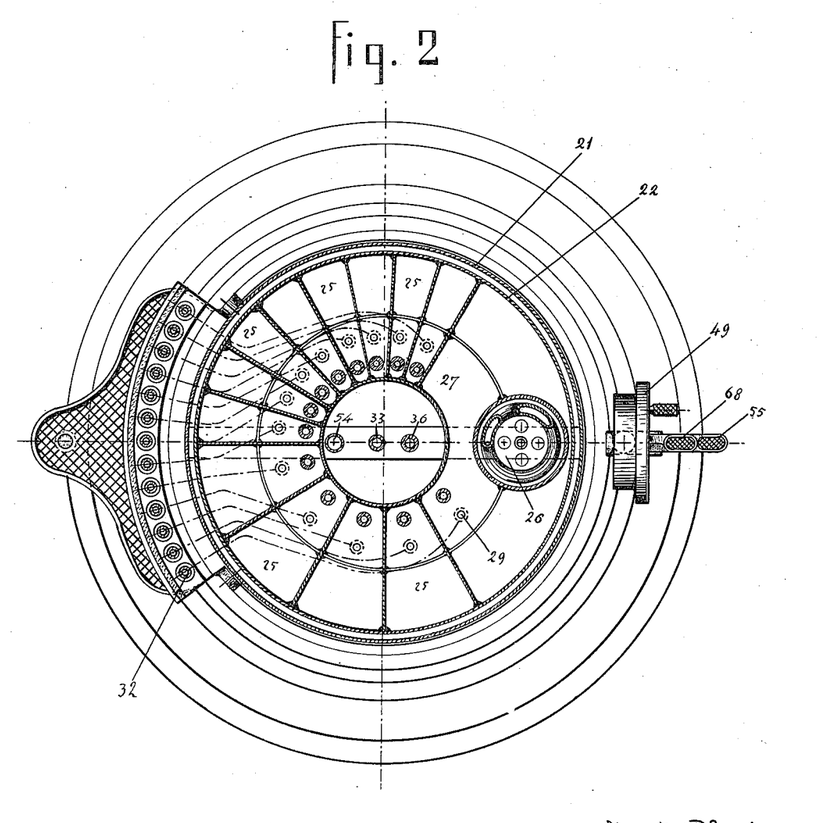
Fig. 2 is a section along the line A—B of Fig. 1.
Figure 3:
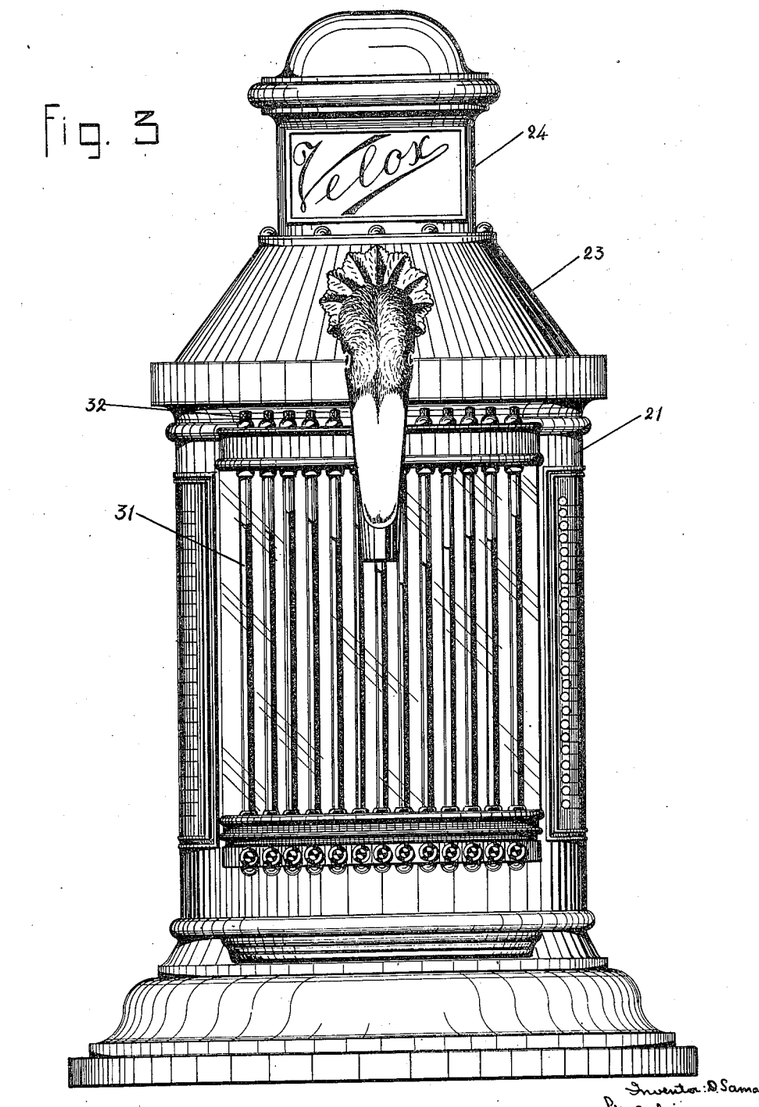
Fig. 3 is a front view of the apparatus.

The main receptacle 22 is subdivided, as is clearly seen in Fig. 2, into a certain number of compartments or secondary receptacles 25 which are intended to contain the various liquids or liquors to be delivered. The receptacle 22 also comprises a cooling compartment 26.

Into the receptacles 25 tubes 27 are plunged for the passage of the liquids that are to be delivered, and each pipe 27 is in communication with a valve 28. The receptacles 25 communicate with the corresponding gage glasses 31 by means of branch pipes 29 and 30.

The receptacles 25 may be filled up by removing the plugs or stoppers 32 and passing the liquid in through the tubes of the gages 31.

Figure 16:
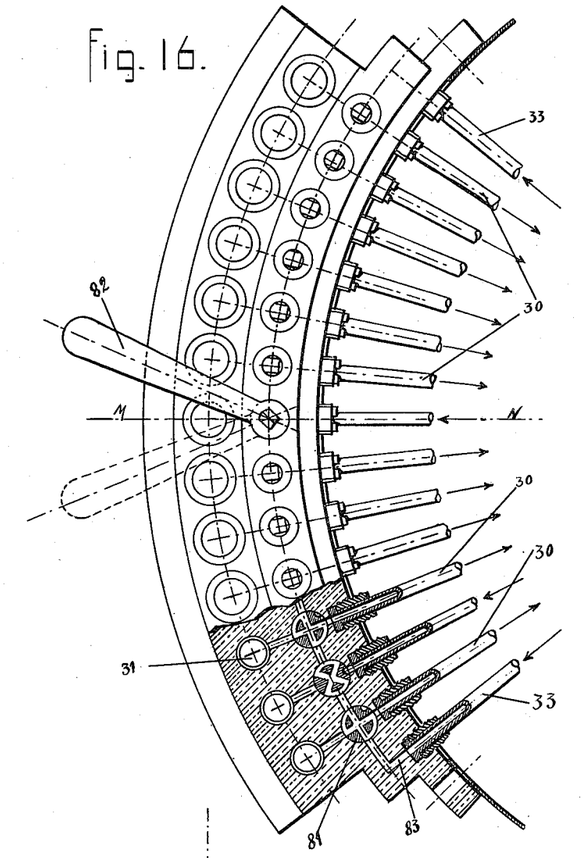
Figs. 16, 17 and 18 are detail views of the level indicators in combination with the compressed-air cocks.
Figure 17:
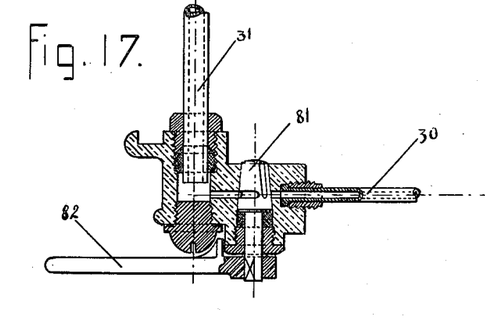
Figure 18:
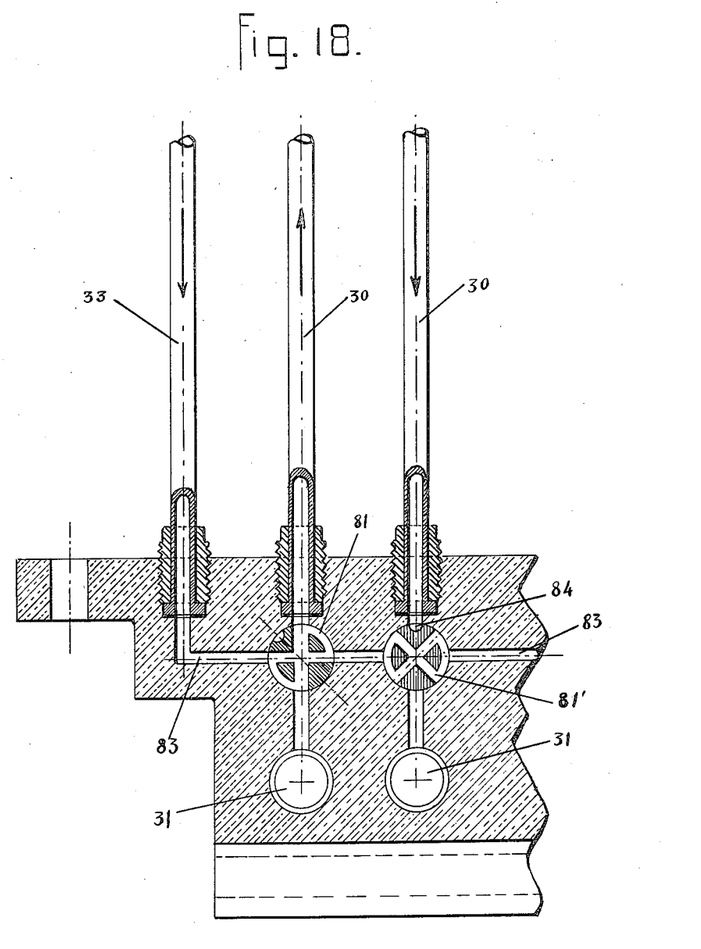

In order to subject the liquids to the necessary pressure a pipe 33 has been provided which comes from the supply of compressed air, and by which the branch pipes 30 are fed (see Figs. 16, 17 and 18).

The pipes 34 and 35 passing through the cooling compartment 26 serve for the delivery of water and of seltzer respectively. Furthermore a pipe 36 has been provided for the washing water, as will be described farther on.

Referring to Figs. 4, 5, 6 and 7, it will be seen that the valves 28 are arranged alternately in two rows, and that each valve is normally pushed upward by a spring, in such a way as to be in contact with the horizontal arm of a bell-crank lever 37. These levers 37 may be operated from the exterior of the apparatus, with a view to bringing about the lowering of the levers 37 and consequently the opening of the valves 28, by means of keys or pushes, as may be seen in Fig. 7. This however is merely a secondary operating device, for the main device for actuating the valves, whether singly or in groups corresponding to the mixtures of liquids desired, consists of a drum 39 mounted on the shaft 40 and constantly pressed upward by spring supports 41. Upon its periphery and along its generating lines this drum has pegs or groups of pegs 42 so provided as to correspond with the liquids or mixtures of liquids to be delivered, the pegs being designed to come into contact with projections 43 on the levers 37 with a view to lowering these levers for the purpose of opening the corresponding valves.

Figure 1:
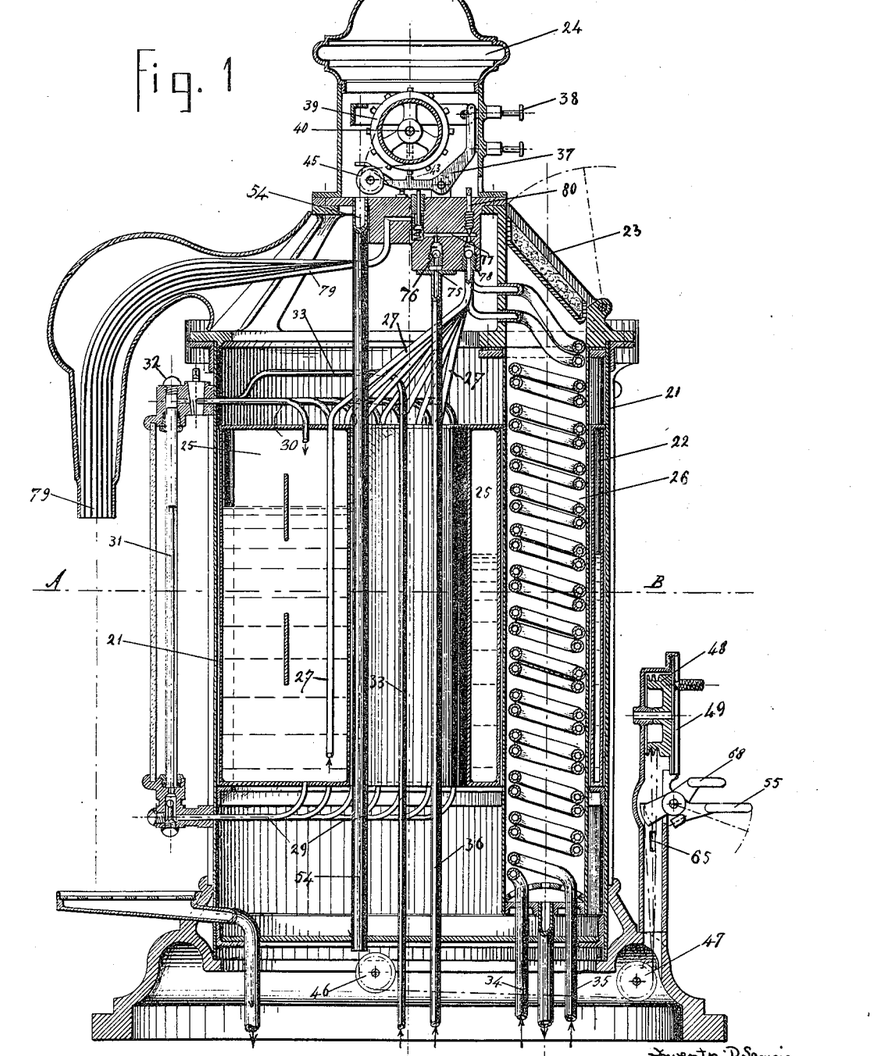
Figure 1 is a side elevation, in section, of the complete apparatus.
Figure 12:
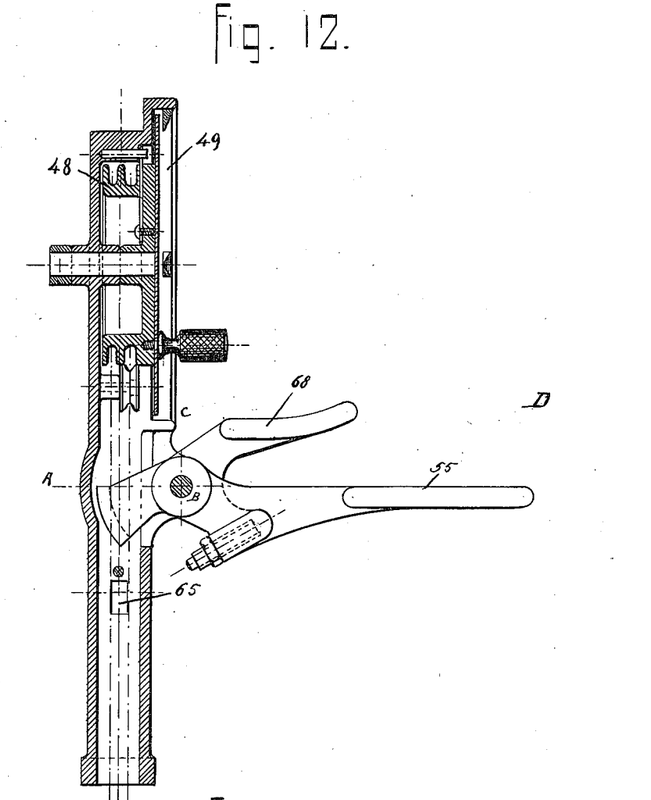
Figs. 12, 13, 14 and 15 are detail views of the controls provided on the exterior of the apparatus.
Figure 13:
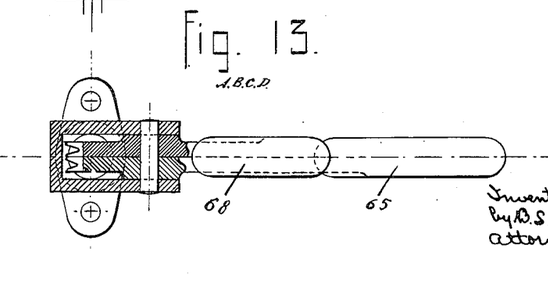

For the purpose of rotating the drum 39 in such a way as to bring into the operative position the desired peg or group of pegs, a cord is wound in the double groove 44 which is cut in the drum, the said cord passing over guide pulleys 45, 46 and 47 (Fig. 1) so as finally to reach a pulley 48 (Fig. 12). This pulley 48 is provided with a dial 49 the divisions on which correspond to the pegs or groups of pegs on the drum 39.

In order to lower the drum 39 in such a way that the desired peg or pegs may come into contact with the corresponding projections on the levers 37, a device has been provided consisting of a stirrup 50 pivoted at 51 and 52, to the center of which, at 53 (Figs. 6 and 7) a cord is attached which, after passing through the pipe 54, leads to a controlling handle 55. It is obvious that by pulling the cord the lateral arms of the stirrup 50 will exert a pressure upon the pivot 40 of the drum, constraining the latter to sink to the desired position.

Figure 8:
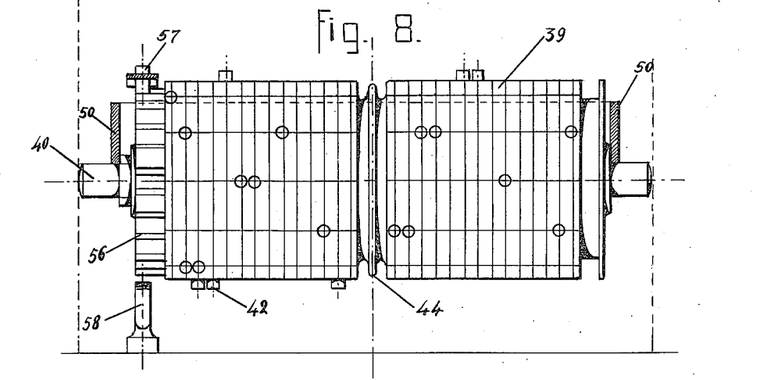
Figs. 8, 9, 10 and 11 are detail views of the auxiliary devices for working the drum.
Figure 9:
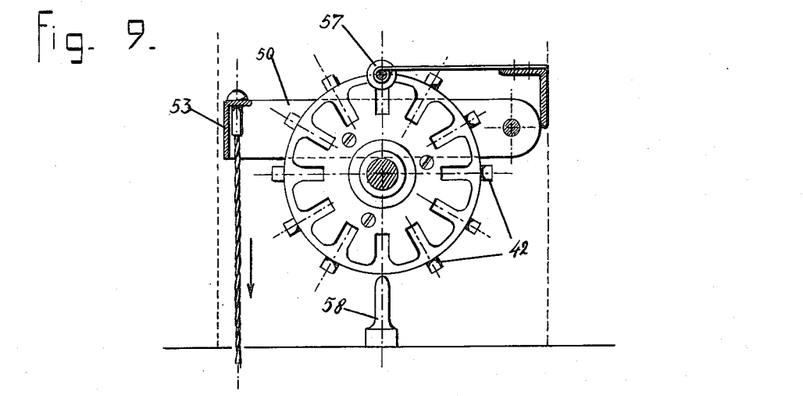
Figure 10:
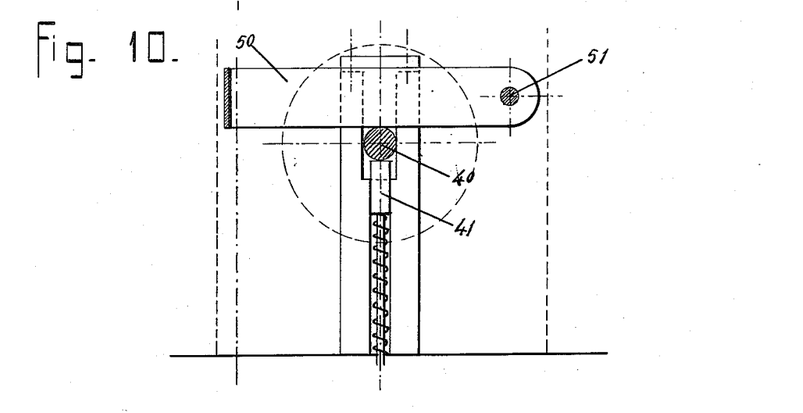

In order to keep the drum 39 in its place a ratchet 56 has been provided, as may be seen in Figs. 8 and 9, which engages with a spring roller 57. When the drum is lowered, the fixed pivot 58 engages in one of the hollows in the ratchet wheel 56, and thereby prevents any rotary displacement of the drum during its descent.

Figure 11:
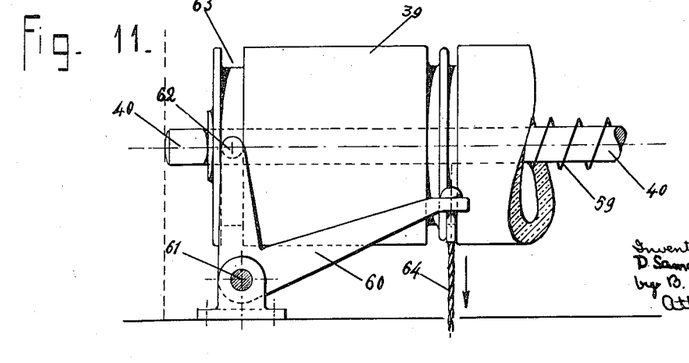
Figure 14:
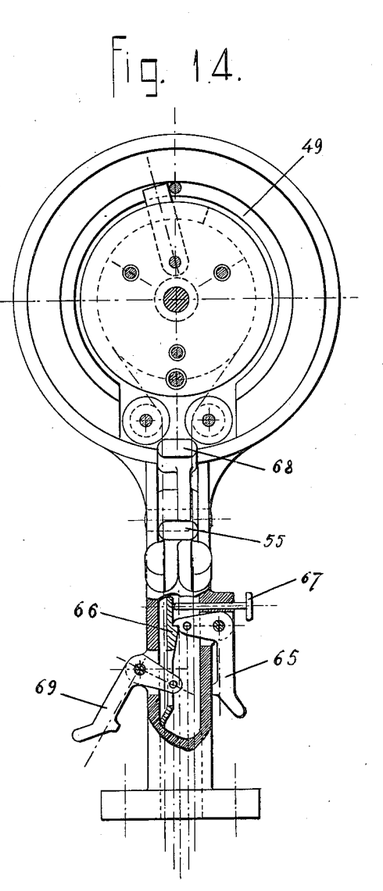
Figure 15:
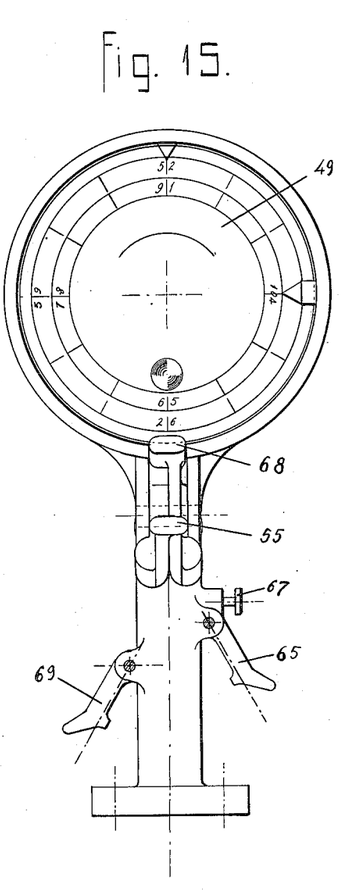

It has already been stated that the number of combinations obtainable might be increased by providing on the drum 39 supplementary sets of pegs, which would be brought into the working position in consequence of a lateral displacement of the drum. As may be seen in Fig. 5, a spring 59, mounted on the pivot of the drum, has the effect of pressing the drum normally toward the right. In order to displace the drum from right to left the following device is utilized, which is illustrated in Fig. 11. A bent lever 60 is pivoted at 61, and carries, at the extremity of one of its arms, a pivot 62, engaging in a groove 63 in the drum, while to the extremity of the other arm of the lever is attached a cord 64 passing through the tube 54 to an operating handle 65 (Figs. 14 and 15). It is clear that when this cord is pulled the pivot 62 will push the drum 39 toward the left overcoming the resistance of the spring 59. The handle 65 is locked in its lowered position by means of the spring tooth 66. For the purpose of unlocking the handle and enabling the drum to return to its original position all that is necessary is to press the button 67.

Figure 4:
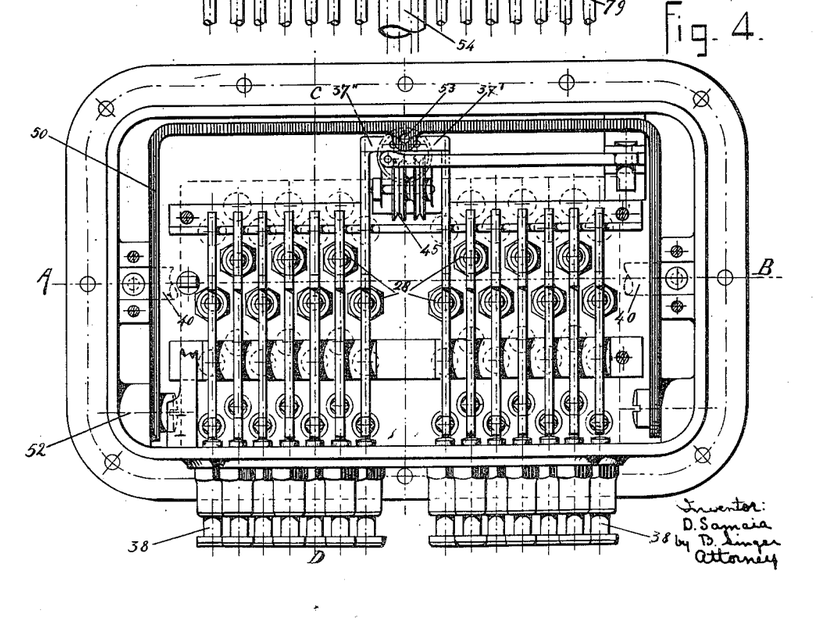
Fig. 4 is a view from above of all the valves.
Figure 5:
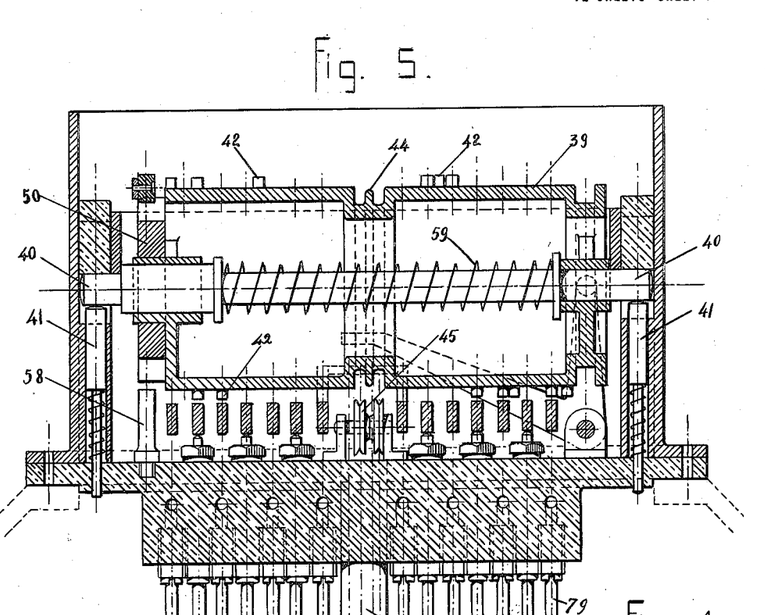
Fig. 5 is a section along the line A—B of Fig. 4, including, also in section, the drum that operates the valves.
Figure 6:
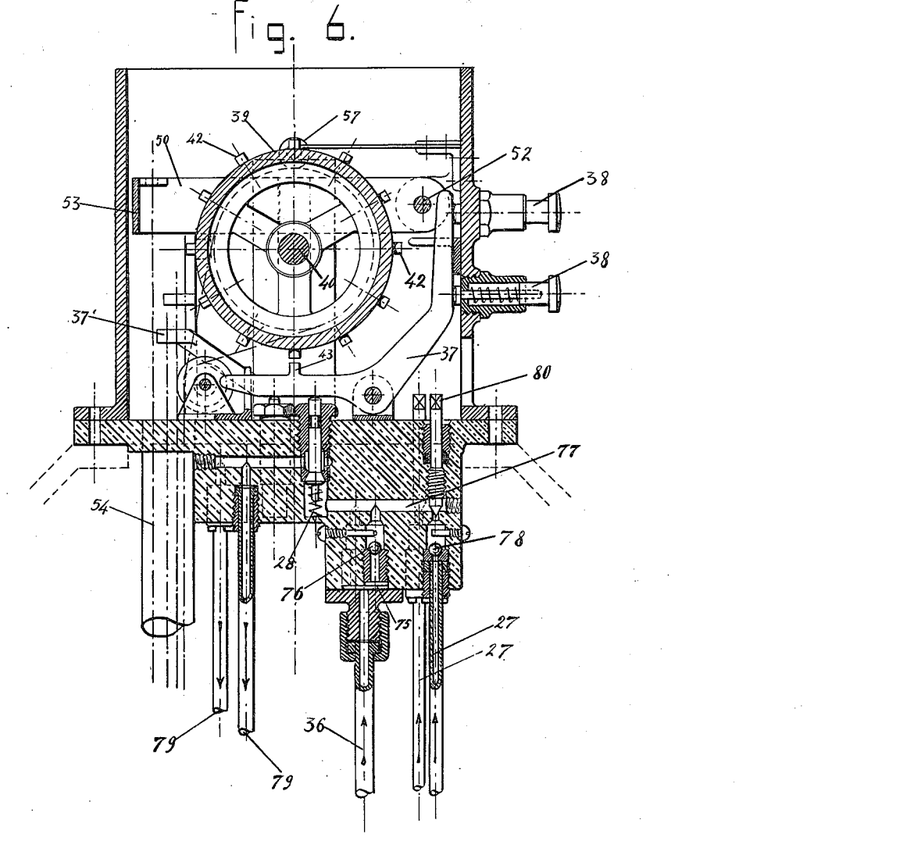
Fig. 6 is a view similar to Fig. 5, but taken along the line C—D of Fig. 4.
Figure 7:
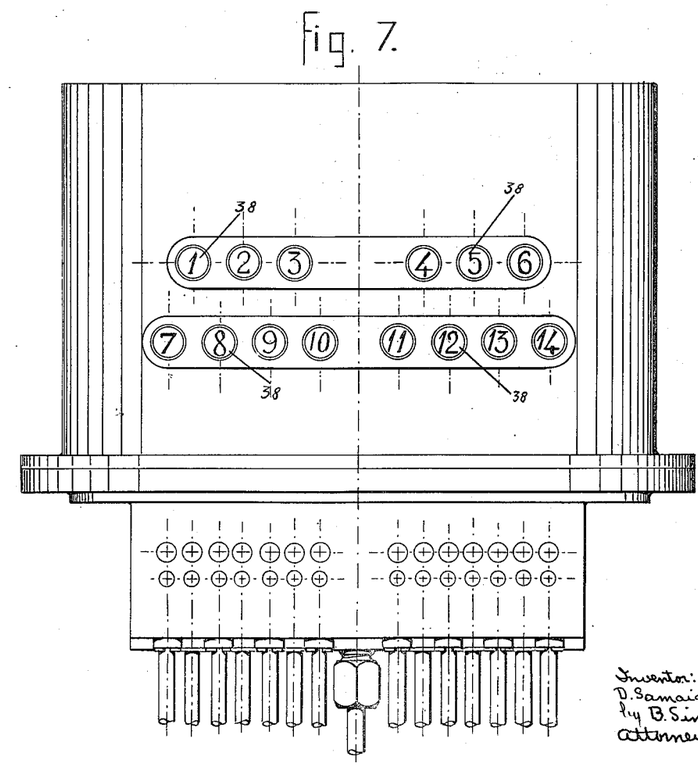
Fig. 7 is a view of the device for operating by means of keys.

For the purpose of delivering water and seltzer independently, the horizontal arms of the two levers 37' and 37", corresponding to the water and seltzer delivery valves, have been prolonged, as may be seen in Fig. 4, and to the extremities of the said arms cords are attached which pass through the tube 54 to the operating handles 68 and 69 (Figs. 12 and 14). Obviously all that is necessary in order to lower the levers 37' and 37" and thereby to open the corresponding valves is to pull these cords.

Figure 19:
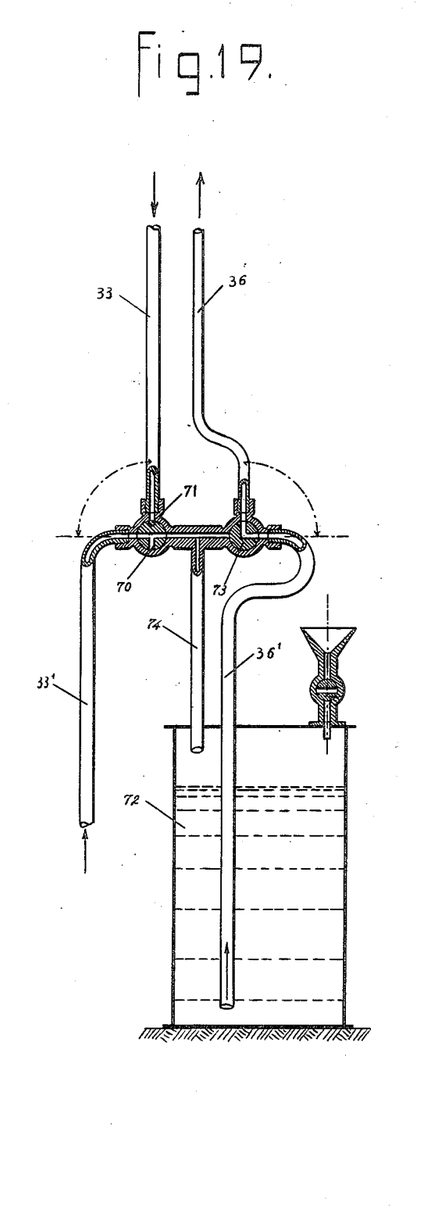
Figs. 19 and 20 are detail views of the washing device.
Figure 20:
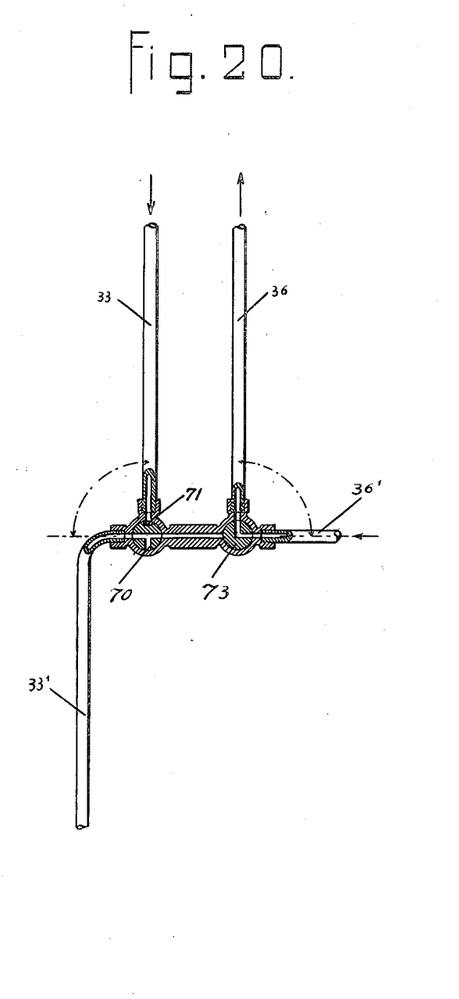

For the purpose of being able to effect the washing of the valves it is necessary above all to eliminate the pressure in the liquor receptacles. To this end a three-way cock 70 has been inserted in the compressed air pipe 33 (Figs. 19 and 20) by means of which cock the supply of compressed air from the lower part 33' of the pipe 33 can be cut off while the air existing in the upper part of the said pipe will be able to escape through the little hole 71 pierced in the cock 70. The water for washing, cold or hot, may be drawn from a tank 72 into which extends a tube 36' which is connected, through the cock 73, to the washing tube 36. In order to give the washing water the necessary pressure a pipe 74 has been provided, which can be put into communication, through the medium of the cock 70, with the compressed air tube 33. In the event of an ordinary drinking water pipe being available it would suffice, for washing purposes, to connect the pipe 36' directly to the said pipe.

The washing water, in flowing through the tube 36, is discharged into the canal 75 (Fig. 6), which is put into communication, by passages 76 having ball closures, with the valves 28. By raising these balls the water can reach the pipes 77 and from there it can reach the valves 28. Other ball closures 78 provided at the upper ends of the liquor supply tubes 27 prevent the water circulating in the pipes 77 from entering the said tubes. The washing water can flow away to the outside through the same pipes 79 that serve for the delivery of the liquors. When the washing is finished, a current of compressed air can be produced by establishing communication between the tube 36 and the pipe 33' by means of the cock 73, which will have the effect of driving out the rest of the water and completing the cleansing.

It will be observed that to the above mentioned pipes 77 are applied adjusting screws 80 by means of which the sizes of the openings through the said pipes, and consequently the flow of the liquids or liquors to be delivered, may be regulated.

For the purpose of removing the pressure from one or other of the liquor receptacles 25, either with a view to renewing the liquid or in the event of damage to the valve or gage, a four-way cock 81 (Figs. 16, 17 and 18) has been provided, in combination with each receptacle and gage, which cock can be worked from the outside by means of a detachable handle 82. In their normal position the cocks 81 all communicate with one another, and each one communicates with its respective receptacle and gage, and since the two end cocks are connected, by means of the passages 83, to the compressed-air tube 33, the compressed air will circulate through all the cocks. When it becomes a question of isolating a given receptacle from the pressure, all that is necessary is to rotate the corresponding cock through 45°, as indicated for example by 81' in Figs. 16 and 18. It will be seen that when the cock occupies this position communication is only maintained between the adjacent cocks, while all communication is cut off with the receptacle and gage tube that it is desired to isolate. The compressed air in the receptacle will escape through the little hole 84 that is pierced for this purpose in the cock.

At the bottom of the gage tubes ball closures are provided for the purpose of preventing the liquids from flowing away in the event of one of the said tubes being broken.

The method of using the apparatus is very simple. In a visible table on the external wall of the apparatus are inscribed, and designated by numbers, the various liquors or beverages that can be served. These numbers are referred to the divisions on the dial 49 and correspond to the various pegs or groups of pegs provided on the drum 39. If it be desired, for instance, to deliver a beverage or a mixture designated by the number 20, one merely has to turn the dial 49 until its index is located over the division No. 20. By turning the dial 49 one obviously causes the pulley 48 to revolve, and since this pulley and the drum are of the same diameter, and the pulley controls by means of a cord the movement of the drum, it is clear that the latter will revolve to an exactly equal extent, which will have the effect of bringing into the operative position the group of pegs corresponding to beverage No. 20. By pressing then on the handle 55 the desired valves will be opened and the desired liquors will flow simultaneously through the channels 79 leading to the mouth of the apparatus.

In the event of the drum 39 comprising supplementary sets of pegs, for the purpose of multiplying the number of possible combinations, there would be a second series of divisions on the dial corresponding thereto.

Having now particularly described and ascertained the nature of the said invention and in what manner the same is to be performed, I declare that what I claim is:—

1. A liquid dispensing apparatus including a receptacle subdivided into a number of compartments, pipes connected to each compartment, valves provided with valve stems in said pipes, and bell cranks having one of their arms above said valve stems and adapted to contact therewith, and a drum above the bell crank for operating, such drum being adapted to operate the valves by contacting with the bell cranks.

2. A liquid dispensing apparatus including a receptacle subdivided into a number of compartments, pipes connected to said compartments, valves provided with valve stems within said pipes, and bell cranks having one of their arms extending above said valve stems and being adapted to contact therewith, a pin on the upper side of such arms, a drum above the bell cranks for operating the same, said drum being provided with pins upon its outer face which latter pins are adapted to engage the pins upon the bell cranks to operate the valves.

3. A liquid dispensing apparatus including a receptacle subdivided into a number of compartments, pipes connected to said compartments, valves provided with valve stems in said pipes, and bell cranks having one of their arms extending above the valve stems and being adapted to contact therewith, a pin upon such arms, a drum located above the bell cranks, such drum being provided with pins arranged over its entire surface, such pins corresponding to the pins upon the bell cranks, and means for rotating the drum to aline a predetermined pin upon said drum with a corresponding pin upon the bell cranks and causing engagement between such pins to operate the bell cranks to actuate the valves.

4. A liquid dispensing apparatus including a receptacle subdivided into a number of compartments, pipes connected to said compartments, valves provided with valve stems in said pipes, and bell cranks having one of their arms extending above the valve stems and being adapted to contact therewith, a pin upon such arms, a drum located above the bell cranks, such drums being provided with pins disposed over its entire surface, such pins corresponding with the pins upon the bell cranks, and means for depressing the drum after alining the pins upon its surface corresponding with the pins upon the bell cranks of the valves which are to be operated, such means being adapted to depress the drum to cause engagement between such pins and actuate the valves.

5. A liquid dispensing apparatus including a receptacle subdivided into a number of compartments, pipes connected to said compartments, valves provided with valve stems in said pipes, and bell cranks having one of their arms extending above the valve stems and being adapted to contact therewith, a pin upon such arms, a drum located above the bell cranks, such drum being provided with pins disposed over its entire surface, means for shifting the drum longitudinally and further means for depressing the same whereby the drum may be shifted so that the pin corresponding with the pin upon the bell crank of the valve which is to be operated may be caused to aline with the bell crank pin to engage the same and operate the valve.

In testimony whereof I have affixed my signature in presence of two witnesses.

DINO SAMAIA.

Witnesses:
ALBERT PERI,
ITO C. FRENK.